United States Patent
Vishwanath et al.

(10) Patent No.: US 9,052,708 B2
(45) Date of Patent: *Jun. 9, 2015

(54) SYSTEMS AND METHODS FOR IMPROVED DEVICE COMMISSIONING AND DECOMMISSIONING

(75) Inventors: Guruprasad Karkala Vishwanath, Hospet (IN); Pradyumna Ojha, Hyderabad (IN); Abhik Banerjee, Hyderabad (IN)

(73) Assignee: General Electric Company, Schenectady, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/604,609

(22) Filed: Sep. 5, 2012

(65) Prior Publication Data

US 2014/0067091 A1 Mar. 6, 2014

(51) Int. Cl.
*G05B 19/042* (2006.01)
*G05B 19/418* (2006.01)

(52) U.S. Cl.
CPC ...... *G05B 19/41845* (2013.01); *G05B 19/4183* (2013.01); *G05B 19/0426* (2013.01); *G05B 2219/31121* (2013.01); *G05B 2219/31334* (2013.01); *G05B 2219/32137* (2013.01); *G05B 2219/32144* (2013.01)

(58) Field of Classification Search
CPC ........... G05B 19/0426; G05B 19/4183; G05B 19/41845; G05B 2219/31121; G05B 2219/32137; G05B 2219/32144
USPC ........ 700/1, 17, 18, 83; 706/45; 709/221, 224
See application file for complete search history.

(56) References Cited

U.S. PATENT DOCUMENTS 5,980,078 A 11/1999 Krivoshein et al.
6,618,630 B1 9/2003 Jundt et al.
(Continued)

FOREIGN PATENT DOCUMENTS

GB 2403043 A 12/2004

OTHER PUBLICATIONS

PCT Search Report and Written Opinion issued in connection with corresponding WO Patent Application No. PCT/US2013/054667 dated on Oct. 11, 2013.

(Continued)

*Primary Examiner* — Robert Fennema
*Assistant Examiner* — Jennifer L Norton
(74) *Attorney, Agent, or Firm* — Fletcher Yoder, P.C.

(57) ABSTRACT

The embodiments described herein include a system and a method. In one embodiment, a system includes a commissioning system configured to operatively couple a field device to a control system. The system further includes a decommissioning system configured to operatively uncouple the field device from the control system. The system additionally includes a graphical user interface (GUI) configured to use the commissioning system, the decommissioning system, or a combination thereof, to operatively couple the field device to the control system, operatively uncouple the field device to the control system, or a combination thereof, by using a plurality of field device states comprising a mismatched state and a commissioned state, wherein the commissioning system is configured to transition the field device from the mismatched state into the commissioned state if the field device is determined to be in the mismatched state.

17 Claims, 9 Drawing Sheets

(56) References Cited

U.S. PATENT DOCUMENTS

| | | |
|---|---|---|
| 7,272,457 B2 | 9/2007 | Glanzer et al. |
| 7,460,865 B2 | 12/2008 | Nixon et al. |
| 7,594,226 B2 | 9/2009 | Stelzer et al. |
| 8,005,553 B2 | 8/2011 | Enver et al. |
| 8,452,675 B2 | 5/2013 | Broom |
| 8,527,888 B2 | 9/2013 | Bump et al. |
| 8,578,059 B2 | 11/2013 | Odayappan et al. |
| 2004/0259533 A1* | 12/2004 | Nixon et al. ............... 455/414.1 |
| 2007/0129820 A1* | 6/2007 | Glanzer et al. ................. 700/20 |
| 2007/0250180 A1 | 10/2007 | Bump et al. |
| 2008/0004727 A1 | 1/2008 | Glanzer et al. |
| 2008/0294771 A1* | 11/2008 | Hermes et al. ............... 709/224 |
| 2009/0177289 A1* | 7/2009 | Glanzer et al. ................... 700/7 |
| 2010/0114334 A1* | 5/2010 | Krumsiek ......................... 700/3 |
| 2012/0035746 A1 | 2/2012 | Broom |
| 2012/0306620 A1 | 12/2012 | Karaffa et al. |
| 2014/0025186 A1* | 1/2014 | Ojha et al. ...................... 700/83 |

OTHER PUBLICATIONS

"800xA Device Management and Fieldbus Overview," System 800xA—The Power of Integration, Dec. 31, 2010, pp. 1-16, XP055082479, Retrieved from the Internet: URL: http://www05.abb.com/global/scot/scot349.nsf/veritydisplay/4b7d270eb6928987c1257837004a37a3/$file/3bdd013081__1__d__en__system__800xa__5.1__device__management__overview.pdf [Retrieved on Oct. 3, 2013].

Jonas Berge, et al: "Fieldbus Foundation (TM) FAT & Commissioning," Manila End-User Seminar, Sep. 23, 2008, pp. 1-19, XP055082490, Retrieved from the Internet: URL: http://www.fieldbus.org.sg/files/2008-09-manila/5b__FAT__Pre-commissioning__Commissioning.pdf [Retrieved on Oct. 3, 2013].

* cited by examiner

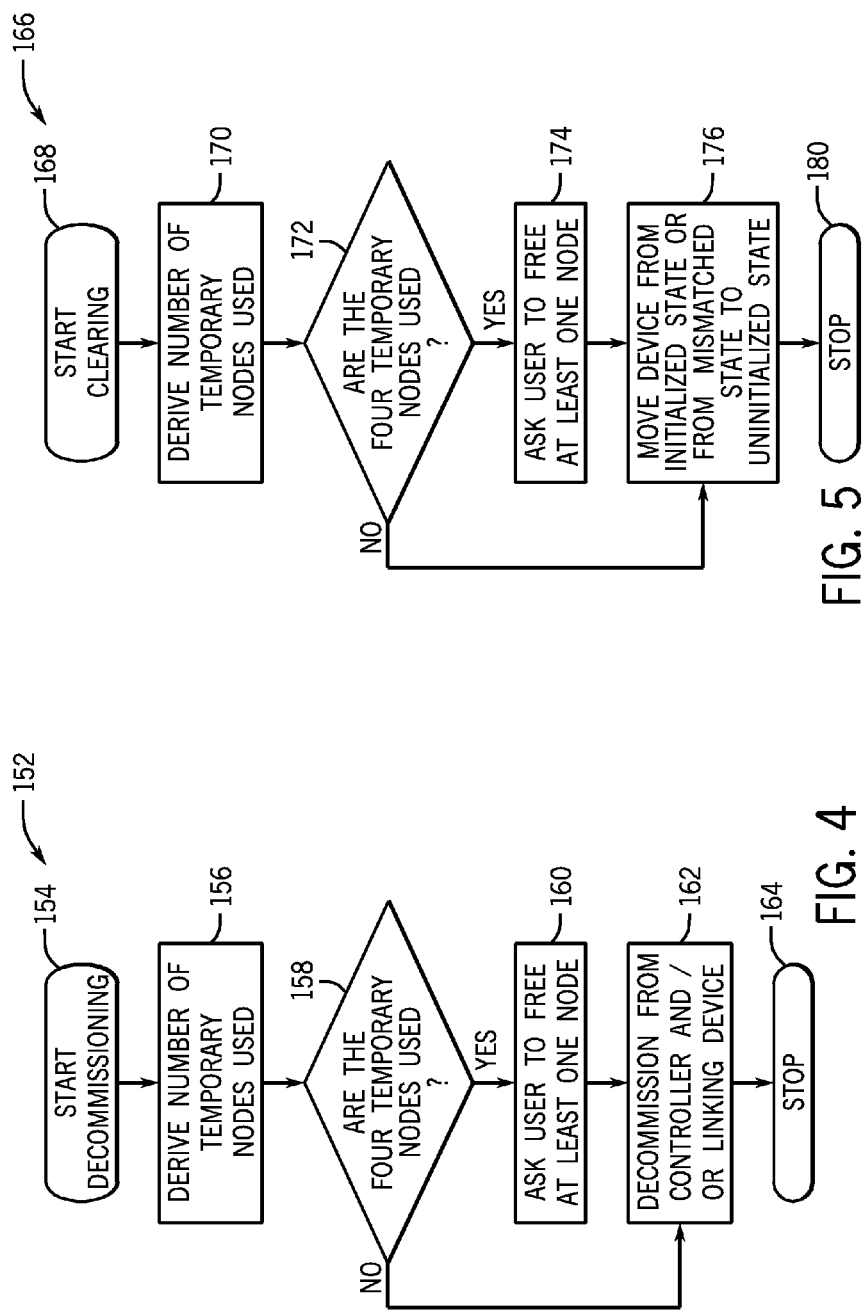

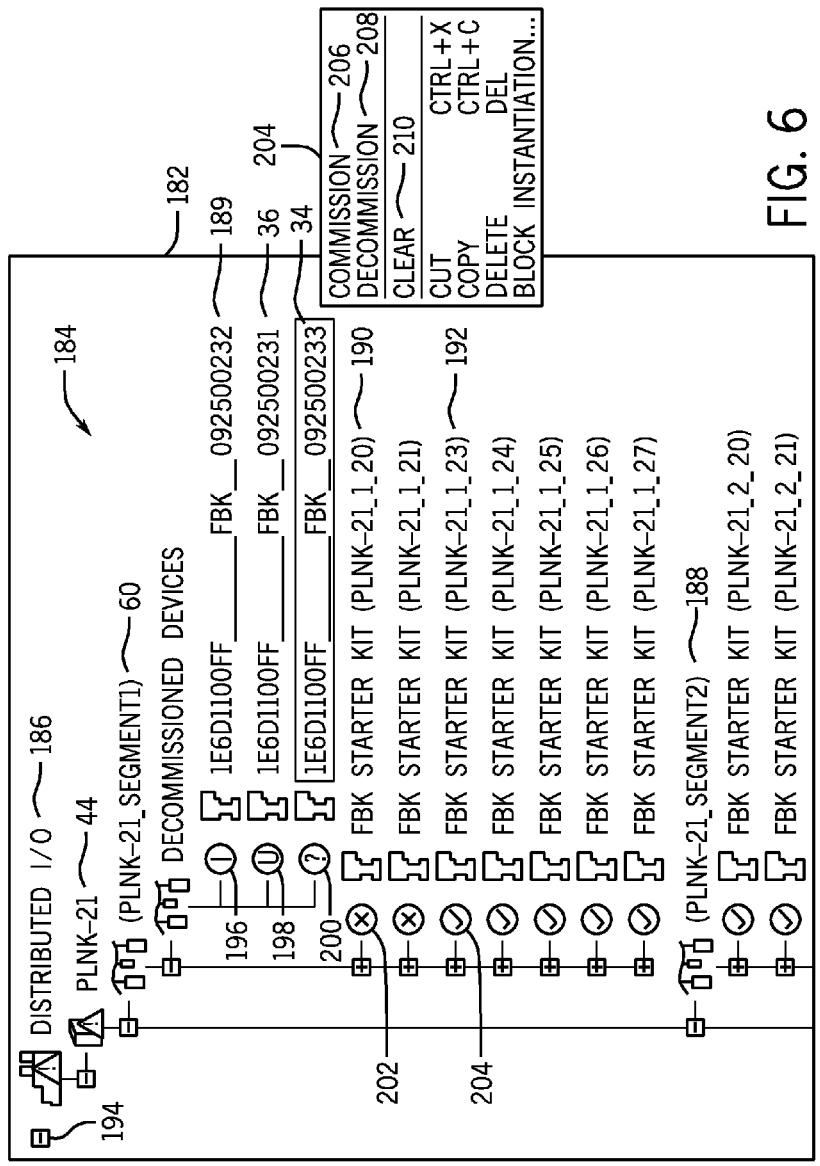

SYSTEMS AND METHODS FOR IMPROVED DEVICE COMMISSIONING AND DECOMMISSIONING

BACKGROUND OF THE INVENTION

The subject matter disclosed herein relates to the commissioning and decommissioning of devices, and more specifically, to the commissioning and decommissioning of field devices.

Certain systems, such as industrial control systems, may provide for control capabilities that enable the execution of computer instructions in various types of field devices, such as sensors, pumps, valves, and the like. For example, a field device may be incorporated into a control system operationally coupled to the control system by a commissioning process. Likewise, the field device may be operationally decoupled from the control system by a decommissioning process. However, the field devices may include devices made by different manufacturers, and may have different operational capabilities and programming Accordingly, commissioning and/or decommissioning the multiple devices may be complex and time consuming

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a commissioning system configured to operatively couple a field device to a control system. The system further includes a decommissioning system configured to operatively uncouple the field device from the control system. The system additionally includes a graphical user interface (GUI) configured to use the commissioning system, the decommissioning system, or a combination thereof, to operatively couple the field device to the control system, operatively uncouple the field device to the control system, or a combination thereof, by using a plurality of field device states comprising a mismatched state and a commissioned state, wherein the commissioning system is configured to transition the field device from the mismatched state into the commissioned state if the field device is determined to be in the mismatched state.

In a second embodiment, a method includes detecting the coupling of a field device to a control system. The method further includes determining a state for the field device. The method additionally includes assigning a first permanent node identification (ID) and a first physical device (PD) tag to the field device if the field device is not in a mismatched state, wherein assigning the first permanent node ID and the first PD tag transitions the field device to a commissioned state.

In a third embodiment, a non-transitory tangible computer-readable medium including executable code is provided. The executable code includes instructions for detecting the coupling of a field device to a control system. The executable code additionally includes instructions for determining a state for the field device. The executable code further includes instructions for assigning a first permanent node identification (ID) and a first physical device (PD) tag to the field device if the field device is not in a mismatched state, wherein assigning the first permanent node ID and the first PD tag transitions the field device to a commissioned state.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a flowchart of a process suitable for decommissioning a field device;

FIG. 5 is a flowchart of a process suitable for clearing a field device;

FIG. 6 is a view of an embodiment of a hierarchical control useful in visualizing field device information;

DETAILED DESCRIPTION OF THE INVENTION

Figure 1:
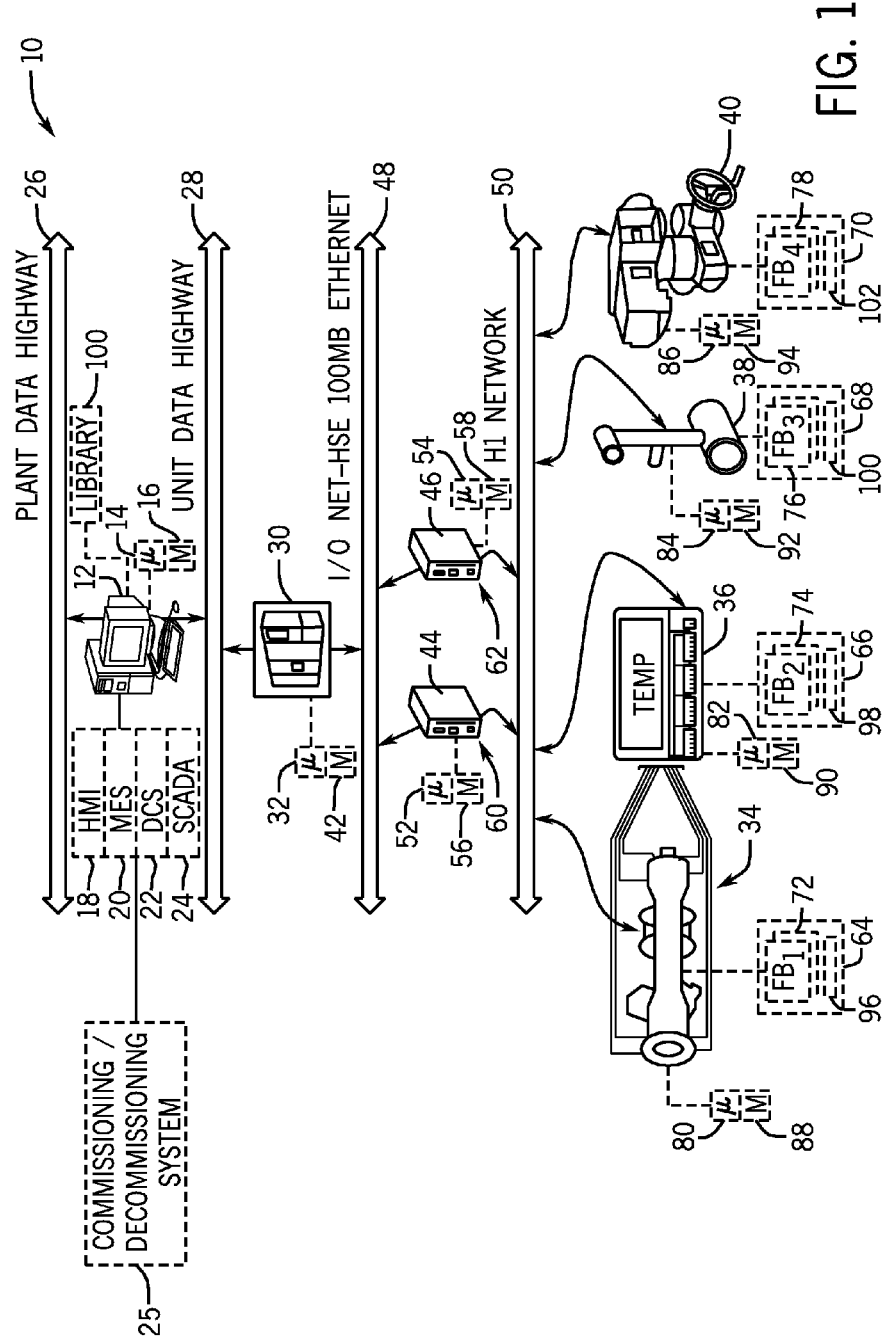
FIG. 1 is a schematic diagram of an embodiment of an industrial control system, including a commissioning/decommissioning system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial control systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark® VIe controller system, available from General Electric Co., of Schenectady, N.Y., multiple field devices may be communicatively coupled to and controlled by a controller. Indeed, multiple controllers may be controlling multiple field devices, as described in more detail with respect to FIG. 1 below. The devices communicatively connected to the controller may include field devices, such as Fieldbus Foundation devices, that include support for the Foundation H1 bi-directional communications protocol. Accordingly, the devices may be communicatively connected with the controller in various communication segments, such as H1 segments, attached to linking devices, to enable a plant-wide network of devices.

The process of enabling a field device to operate as part of a control system is defined as a commissioning process. Similarly, the process of removing a device from the control system while maintaining control system consistency, is defined as a decommissioning process. Advantageously, the systems and methods described herein enable improved commissioning and decommissioning processes. In certain embodiments, the commissioning of the devices may be more efficiently performed even for devices found to be in a variety of states, including mismatched states, uninitialized states, and initialized states. Likewise, a decommissioning of devices may be more efficiently performed by the disclosed embodiments, even for devices including mismatched states, uninitialized states, and initialized states. Similarly, a clearing, or the moving of a device into an uninitialized state from a mismatched state or from an initialized state, may also be performed more efficiently using the disclosed embodiments.

In certain embodiments, a graphical user interface (GUI) is provided, including a plurality of screens suitable for commissioning, decommissioning, and clearing of devices. Advantageously, the GUI may include graphical elements that enable more organized and efficient graphical presentation of the devices and their related states, and that may be used for commissioning and/or decommissioning of the devices. Software tools, such as a commissioning, decommissioning, and clearing "wizards," are also provided, suitable for guiding users, such as a commissioning engineer or control engineer, through commissioning and/or decommissioning of devices.

In certain embodiments, a process is provided suitable for more efficiency commissioning field devices, such as when certain field devices are in a mismatched state. For example, following certain protocols, such as a Fieldbus Foundation protocol, may specify that field devices be assigned to certain segments, as described in more detail below. The field devices not yet commissioned in the segment may be assigned a temporary node address. Once a certain number of temporary nodes are used, e.g., 4 nodes as specified by the current Fieldbus Foundation standard, then newer devices connected to the same segment may be allocated to a mismatched state. It is to be noted that future Fieldbus Foundation standards or other standards may specify other temporary node limits, such as 1, 2, 3, 5, 6, 7, 8, 9, 10 or more temporary nodes may be specified as available for use in a single segment.

Regardless of the temporary node limit specified (e.g., 4 nodes), once the limit is reached, the commissioning engineer may have to physically remove one or more of the field devices assigned to the temporary nodes so that a newly introduced field device may be commissioned. Additionally or alternatively, one of the field devices assigned a temporary node address may be commissioned to free a temporary node address, even though such commissioning may not be desired. The process described herein with respect to FIG. 11 may be used to commission newly introduced field devices without resorting to physically disconnecting field devices or commissioning undesired field devices even when the limit of temporary nodes is reached. By enabling commissioning of devices regardless of the number of temporary nodes used, a more efficient commissioning process may be enabled.

Turning to FIG. 1, an embodiment of an industrial process control system 10 is depicted. The control system 10 may include a computer system 12 suitable for executing a variety of field device configuration and monitoring applications, and for providing an operator interface through which an engineer or technician may monitor the components of the control system 10. Accordingly, the computer 12 includes a processor 14 that may be used in processing computer instructions, and a memory 16 that may be used to store computer instructions and other data. The computer system 12 may include any type of computing device suitable for running software applications, such as a laptop, a workstation, a tablet computer, or a handheld portable device (e.g., personal digital assistant or cell phone). Indeed, the computer system 12 may include any of a variety of hardware and/or operating system platforms. In accordance with one embodiment, the computer 12 may host an industrial control software, such as a human-machine interface (HMI) software 18, a manufacturing execution system (MES) 20, a distributed control system (DCS) 22, and/or a supervisor control and data acquisition (SCADA) system 24. A commissioning/decommissioning system 25 may be included in the HMI 18, MES 20, DCS 22, and/or SCADA 24, and used to commission and/or decommission certain devices, as explained in more detail below. The HMI 18, MES 20, DCS 22, SCADA 24 and/or commissioning/decommissioning system 25, may be stored as executable code instructions on non-transitory tangible computer readable media, such as the memory 16 of the computer 12. For example, the computer 12 may host the ToolboxST™ and/or ControlST™ software, available from General Electric Co., of Schenectady, N.Y.

Further, the computer system 12 is communicatively connected to a plant data highway 26 suitable for enabling communication between the depicted computer 12 and other computers 12 in the plant. Indeed, the industrial control system 10 may include multiple computer systems 12 interconnected through the plant data highway 26. The computer system 12 may be further communicatively connected to a unit data highway 28, suitable for communicatively coupling the computer system 12 to an industrial controller 30. The industrial controller 30 may include a processor 32 suitable for executing computer instructions or control logic useful in automating a variety of plant equipment, such as a turbine system 34, a temperature sensor 36, a valve 38, and a pump 40. The industrial controller 30 may further include a memory 42 for use in storing, for example, computer instructions and other data. The industrial controller 30 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 30 may be a Mark® VIe controller system, available from General Electric Co., of Schenectady, N.Y.

In the depicted embodiment, the turbine system 34, the temperature sensor 36, the valve 38, and the pump 40 are communicatively connected to the industrial controller 30 by using linking devices 44 and 46 suitable for interfacing between an I/O network 48 and an H1 network 50. For example, the linking devices 44 and 46 may include the FG-100 linking device, available from Softing AG, of Haar, Germany. As depicted, the linking devices 44 and 46 may include processors 52 and 54, respectively, useful in executing computer instructions, and may also include memory 56 and 58, useful in storing computer instructions and other data. In some embodiments, the I/O network 48 may be a 100 Megabit (MB) high speed Ethernet (HSE) network, and the H1 network 50 may be a 31.25 kilobit/second network. Accordingly, data transmitted and received through the I/O network 48 may in turn be transmitted and received by the H1 network 50. That is, the linking devices 44 and 46 may act as bridges between the I/O network 48 and the H1 network 50. For example, higher speed data on the I/O network 48 may be buffered, and then transmitted at suitable speed on the H1 network 50. Accordingly, a variety of field devices may be linked to the industrial controller 30 and to the computer 12. For example, the field devices 34, 36, 38, and 40 may include or may be industrial devices, such as Fieldbus Foundation devices that include support for the Foundation H1 bi-directional communications protocol. The field devices 34, 36, 38, and 40 may also include support for other communication protocols, such as those found in the HART® Communications Foundation (HCF) protocol, and the Profibus Nutzer Organization e.V. (PNO) protocol.

Each of the linking devices 44 and 46 may include one or more segment ports 60 and 62 useful in segmenting the H1 network 42. For example, the linking device 44 may use the segment port 60 to communicatively couple with the devices 34 and 36, while the linking device 46 may use the segment port 62 to communicatively couple with the devices 38 and 40. Distributing the input/output between the field devices 34, 36, 38, and 40, by using, for example, the segment ports 60 and 62, may enable a physical separation useful in maintaining fault tolerance, redundancy, and improving communications time.

Each field device 34, 36, 38, and 40 may include a respective device description (DD) file, such as the depicted DD files 64, 66, 68, and 70. The DD files 64, 66, 68, and 70 may be written in a device description language (DDL), such as the DDL defined in the International Electrotechnical Commission (IEC) 61804 standard. In some embodiments, the files 64, 66, 68, and 70 are tokenized binary files. That is, the DD files 64, 66, 68, and 70 may include data formatted in a tokenized binary format useful in reducing the size of the DD files 64, 66, 68, and 70. The DD files 64, 66, 68, and 70 may each include one or more function blocks 72, 74, 76, and 78. The function blocks 72, 74, 76, and 78 may include computer instructions or computer logic executable by processors 80, 82, 84, and 86. Indeed, the function blocks 72, 74, 76, and 78 may be instantiated into memory 88, 90, 92, 94, and then executed by the processors 80, 82, 84, and 86, respectively. The each of the DD files 64, 66, 68, and 70 may also include device information 96, 98, 100, and 102, such as manufacturer identification (ID), device type, device revision, DD revision, and/or update revision, which may be used during commissioning or decommissioning by the commissioning/decommissioning system 25, as described in more detail below.

In this way, the field devices 34, 36, 38, and 40 may contribute control logic and other computer instructions towards the execution of processes in the industrial process control system 10. Advantageously, the systems and methods disclosed herein provide the user (e.g., control engineer or commissioning engineer) with an improved commissioning/decommissioning system 25 and methods, as described in more detail with respect to FIG. 2.

Figure 2:
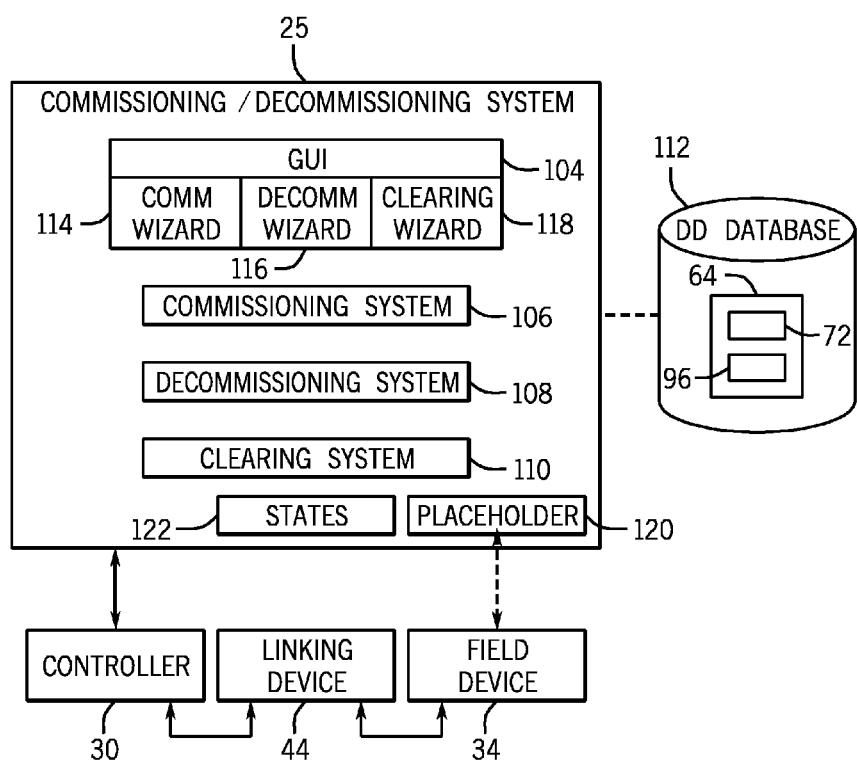
FIG. 2 is a block diagram of the commissioning/decommissioning system of FIG. 1.

FIG. 2 is a block diagram illustrating an embodiment of the commissioning/decommissioning system 25, which may be used to commission and/or decommission the devices 34, 36, 38, and/or 40. As mentioned above, the commissioning/decommissioning system 25 may be included in the HMI 18, the MES 20, the DCS 22, and/or the SCADA 24 and may be stored as executable code instructions on non-transitory tangible computer readable media, such as the memory 16 of the computer 12. In the depicted embodiment, the commissioning decommissioning system 25 includes a GUI 104, a commissioning system 106, a decommissioning system 108, a clearing system 110, and a device description (DD) database 112. The GUI 104 may further include a commissioning wizard 114, a decommissioning wizard 116, and a clearing wizard 118, suitable for guiding the user through commissioning, decommissioning, and clearing steps, as described in more detail below. Indeed, the GUI 104 may be used as an interface to the commissioning system 106, the decommissioning system 108, and the clearing system 110.

In one embodiment, the commissioning/decommissioning system 25 may be communicatively coupled to the controller 30, which is turn is communicatively coupled to various linking devices, such as the linking device 44, which may provide further communications with field devices, such as the field device 34. In other embodiments, the commissioning/decommissioning system 25 may be communicatively coupled to the controller 30, the linking device 44, and/or the field device 34.

In one example, a placeholder 120 or virtual field device may be created using the system 25. The placeholder 120 may be an object stored in memory 16 that represents the field device 34. Accordingly, a user may pre-commission a system by creating one or more of the placeholder 120, each of the placeholders 120 representing the device 34, and then use the placeholder(s) 120 during commissioning of the physical field device 34. The placeholder 120 may include physical device (PD) tag, manufacturer ID, device type, device revision, DD revision, and/or update revision representative of the field device 34. The PD tag may include a device name useful in identifying the device 34. Likewise, the manufacturer ID may include information identifying the manufacturer of the device 34. The device type may be suitable for identifying the type of device 34 (e.g., valve, sensor, actuator), while the device revision may be a version number indentifying the device version. Likewise, the DD revision may identify the DD version, such as a DD file version included in the device 34. In another example, the device 34 may be commissioned without using the placeholder 120.

During commissioning activities, the field device 34 may first be communicatively coupled to the linking device 44, such as by using a cable to connect the field device 34 to one of the ports 60 of the linking device 44. The linking device 44 and/or field device 34 may then issue signals that the field device 34 is now a "live" device ready to participate in the control system 10. In certain embodiments, a "livelist" of live devices may be used and updated when a new device goes live (e.g., is connected to the control system 12). The user may then use the commissioning system 106, for example, by interacting with the GUI 104, to commission the field device 34. Advantageously, the techniques disclosed herein may derive certain states 122 for the noncommissioned field device 34, and then use the states 122 for commissioning the device 34. The states 122 may include an uninitialized state, in which the live device 34 has assigned a temporary node ID (e.g., numbered 248-251), and does not have assigned a permanent node ID or a physical device (PD) tag. The states 122 may additionally include an initialized state, in which the live device 34 has assigned a PD tag, also has assigned a temporary node ID (e.g., numbered 248-251), but does not have assigned a permanent node ID. The states 122 may further include a mismatched state, in which the live device 34 has PD tag assigned and a permanent node ID (e.g., numbered 20-247) assigned, however, no node address for the live device 34 may be found in the commissioning/decommissioning system 25 and/or no DD file 64 associated with the live device 34 may be found in the DD database 112.

The commissioning system 25 may commission the live device 34 regardless of the state 122 (e.g., uninitialized, initialized, mismatched) that the device 34 may be found in, as described in more detail below with respect to FIG. 3. Accordingly, a fourth state 122, the commissioned state, may be assigned to the device 34 upon commissioning. In this commissioned state, the live device 34 may have a PD tag assigned, and a permanent node ID assigned (e.g., numbered 0-247), and a node address used by the commissioning/decommissioning system 25 may also be created. This node address may be allocated internal to the commissioning/decommissioning system 25 and used to "point" to the device 34 in memory. During commissioning, the DD file 64 may be used to instantiate function block 72 information into the field device 34. Once commissioned, the field device 34 may be used during operations of the control system 10.

The GUI 104 may also be used as an interface to the decommissioning system 108 to decommission the field device 34. For example, once the live device 34 is commissioned and operational, it may become desirable to replace or otherwise remove the device from operations of the control system 12. Accordingly, the GUI 104 and decommissioning system 108 may be used, for example, to place the field device 34 in the uninitialized state. Accordingly, the GUI 104 and the decommissioning system 108 may assign a temporary node ID (e.g., numbered 248-251) to the device 34. Additionally, the GUI 104 and the clearing system 110 may be used to "clear" the device 34 by moving the device 34 from the initialized state or the mismatched state into the uninitialized state. By deriving the states 122 and by enabling the transition between states, the commissioning/decommissioning system 25 may more efficiently enable the placement of the device 34 into operation, and may more efficiently enable the removal and/or replacement of the device 34.

Figure 3:
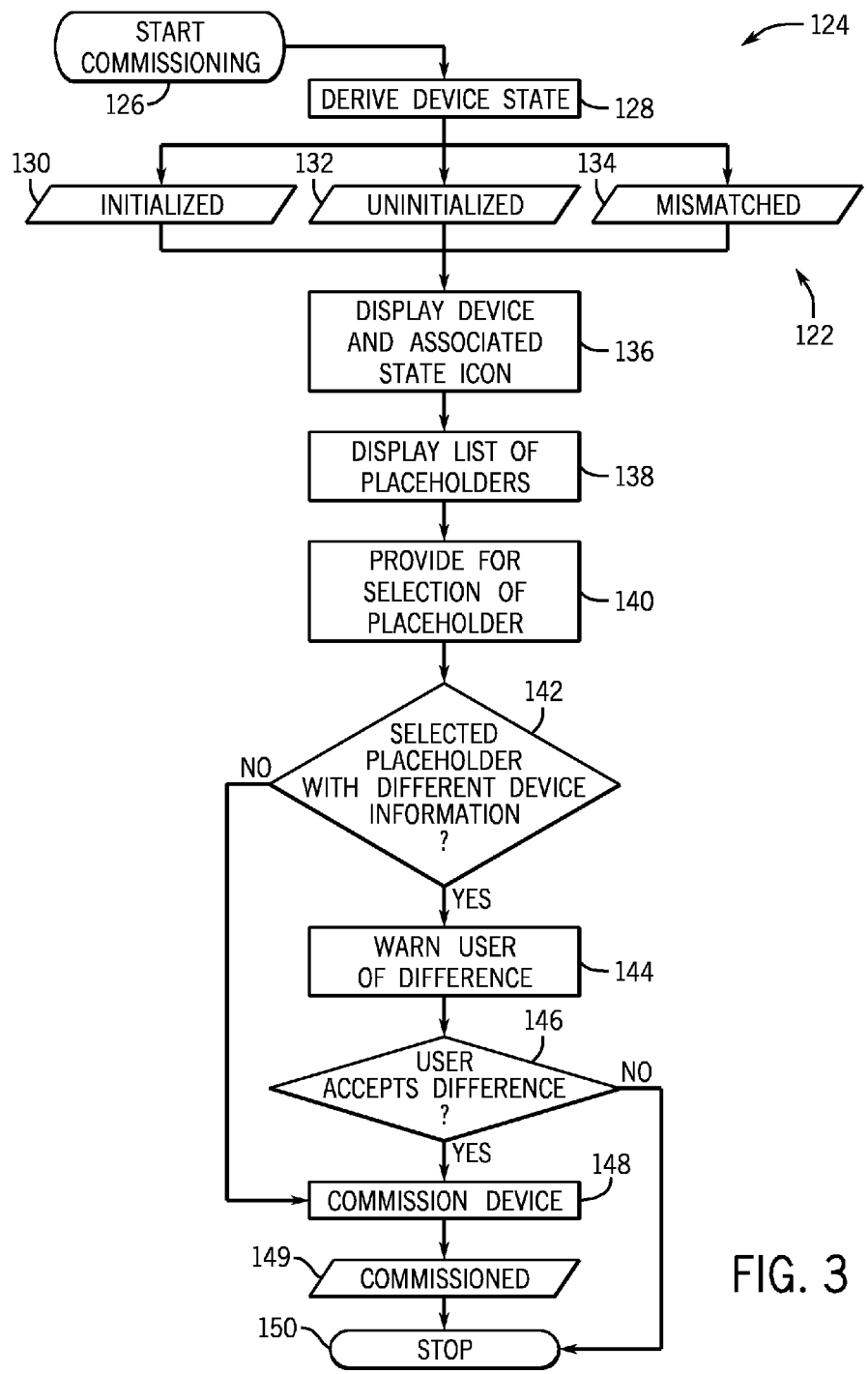
FIG. 3 is a flowchart of a process suitable for commissioning a field device.

FIG. 3 is a flowchart of an embodiment of a process 124 suitable for commissioning the field devices 34, 36, 38, and/or 40. The process 124 may be used by the commissioning/decommissioning system 25 to operatively couple the devices 34, 36, 38, and/or 40 so that the devices 34, 36, 38, and/or 40 may participate in control activities. The process 124 may be stored in the memory 16 of the computer 12 as non-transitory tangible computer readable media including executable computer instructions configured to implement the process 124. The process 124 may begin commissioning (block 126) the device 34, for example, when the field device 34 is physically connected to the linking device 44 and thus appears in the livelist. The process 124 may then derive (block 128) the state 122 of the device 34, as described above with respect to FIG. 2, resulting in the device being assigned an initialized state 130, an uninitialized state 132, or a mismatched state 134. The process 124 may additionally use the GUI 104 to display (block 136) the device 34 as well as an associated graphical representation, such as an icon, of the device's state 122.

The process 124 may then derive and display (block 138) a list of one or more placeholders 120 associated with the device 34. In the depicted embodiment, the process 124 may then provide (block 140) for the selection of at least one placeholder 120 to be used for commissioning the device 34. Accordingly, the user may select the placeholder 120 and continue commissioning by using the placeholder's 120 device information. The process 124 may, for example, compare information derived from the device 34 with information included in the selected placeholder 120 to determine (decision 142) if there are any discrepancies. The compared information may include the device tag (e.g., device name), the device ID, the device revision, the DD revision, and/or the update revision. If the process 124 determines (decision 142) that there is a difference between the selected placeholder 120 and the live device 34, then the process 124 may warn (block 144) of any differences found. Certain differences between the placeholder 20 and the device 34 may not preclude commissioning. Advantageously, the techniques disclosed herein may still commission the device 34 even though the selected placeholder 120 may have a different device revision, DD revision, and/or update revision when compared to the device 34. Accordingly, if the user accepts the differences (decision 146), the process 124 may then commission (block 148) the device 34, updating the device's status to a commissioned status 149, and stop (block 150). If the user does not accept the differences (decision 146), the user may then stop (block 150) the commissioning process 124.

In this manner, the user is notified (block 144) of discrepancies, and may stop (block 150) the process 124 to correct any discrepancies or errors introduced when creating the placeholder 120. Commissioning (block 148) the device 34 may include configuring the memory 88 of the device 34 with information found in the placeholder 120, including any function blocks 72 and device information 96 associated with the placeholder 120. In this manner, the process 124 may more efficiency commission the device 34.

FIG. 4 is a flowchart of an embodiment of a process 152 suitable for decommissioning the field devices 34, 36, 38, and/or 40. The process 152 may be used by the commissioning/decommissioning system 25 to operatively decouple the devices 34, 36, 38, and/or 40 from participating in control activities for the control system 10. The process 152 may be stored in the memory 16 of the computer 12 as non-transitory tangible computer readable media including executable computer instructions configured to implement the process 152. The process may begin decommissioning (block 154) the device 34, for example, as directed by the user. The process 154 may then derive (block 156) the number of temporary nodes being currently used. As mentioned before, certain devices may be assigned or otherwise allocated to temporary nodes (e.g., numbered 248-251), for example, to be used during later commissioning activities. If the process 152 determines (decision 158) that there are four temporary nodes already in use, then the process 152 may ask the user (block 160) to free at least one node. Once the user frees at least one node, the process 152 may then decommission (block 162) the device 34 from the controller 30 and/or the linking device 44. Likewise, if the four temporary nodes are not in use and there is a free node (decision 158), the process 152 may decommission (block 162) the device 34. During decommissioning (block 162), the device 34 may be placed into the uninitialized state 132 so that the controller 30 and/or the linking device 44 are aware that the device is no longer participating in control activities. The process 152 may then stop (block 164). Additional or alternative to the decommissioning process 152, a clearing process may be used, as described in more detail below.

FIG. 5 is a flowchart of an embodiment of a process 166 suitable for clearing the field devices 34, 36, 38, and/or 40. The process 166 may be used by the commissioning/decommissioning system 25 to transition between the states 122 of the devices 34, 36, 38, and/or 40, for example, from the mismatched state 134 or from the initialized state 130 to the uninitialized state 132. In this manner, the devices 34, 36, 38, and/or 40 may be placed in better condition for commissioning at a later time. The process 166 may be stored in the memory 16 of the computer 12 as non-transitory tangible computer readable media including executable computer instructions configured to implement the process 166. The process 166 may begin clearing (block 168) the device 34, for example, when the user desires to set the device 34 state to the uninitialized state 132. The process 166 may derive (block 170) the number of temporary nodes being currently used. As mentioned before, certain devices may be assigned or otherwise allocated to temporary nodes (e.g., nodes numbered 248-251), for example, to be used during later commissioning activities. If the process 166 determines (decision 172) that there are four temporary nodes already in use, then the process 166 may ask the user to free at least one node (block 174). Once the user frees at least one node (block 174), the process 166 may then transition the device state (block 176) from the initialized state 130 or from the mismatched state 134 into the uninitialized state 132, and then stop (block 180). Accordingly, the device 34 may be cleared for subsequent use. Likewise, if the process 166 determines that not all of the four temporary nodes are in use, the process 166 may then transition the device state (block 176) from the initialized state 130 or from the mismatched state 134 into the uninitialized state 132, and then stop (block 180).

FIG. 6 is an embodiment of a screen 182 having a hierarchical display 184 suitable for displaying certain components of the control system 10, including a distributed I/O 186 of the controller 30, linking devices 44, 54, segments 60, 188, and devices, such as devices 34, 36, 189, 190, 192. The screen 182 may be included in the GUI 104 of the commissioning/decommissioning system 25, and may be used as an interface to view the status of the various devices 34, 36, 189, 190, 192, as well as to commission, decommission, and clear the various devices 34, 36, 189, 190, 192. The screen 182 may be implemented by using computer code or executable instructions stored in a machine-readable medium, such as the memory 16 of the computer 12, and provided by the HMI 18, MES 20, DCS 22, and/or SCADA 24.

In the depicted embodiment, the screen 182 uses a hierarchical tree control 194 suitable for displaying a tree structure. For example, the root is displayed as the distributed I/O 186 of the controller 30, and the next level of the tree includes the linking device 44. The level under the linking device 44 additionally includes the segments 60 and 188, while each displayed segment 60 and 188 may include further details associated with the segment, such as field devices 34, 36, and so on. Additionally, certain icons 196, 198, 200, 202, and 204 may be used to display information associated with the devices 189, 36, 34, 190, and 192, respectively. For example, the "checkmark" icon 204 may be used to denote that the device 192 is commissioned and operating in the control system 10. Likewise, the icon 202 may be used to indicate that the device 190 is not yet connected (e.g., is not a "live" device) to the control system 10. Status information for the live devices 189, 34, and 36, may be provided by the icons 196, 198, 200 denoting the initialized status 130, the uninitialized status 132, and the mismatched status 134, respectively. By providing the icons 196, 198, 200, 202, and 204, the screen 182 may more efficiently provide status 122 information, as well as the hierarchy of interconnected components of the control system 10.

Further depicted in FIG. 6 is context menu 204 useful in selecting various process, such as the commissioning process 124, the decommissioning process 152, and the clearing process 166. In use, a mouse may be used to select a device, such as the device 34, and a GUI action, such as a mouse right click, may be used to display the context menu 204. It is to be noted that other actions, such as keyboard actions, voice command actions, and so forth, may be used to display the context menu 204. A menu item 206 labeled "commission" may be used to execute the commissioning process 124. Likewise, a menu item 208 labeled "decommission" may be used to execute the decommissioning process 152. Similarly, a menu item 210 labeled "clear" may be used to execute the clearing process 166. In some cases, one or more of the menu items 206, 208, 210 may be disabled, and shown as inactive (e.g., "grayed out") in the context menu 204. For example, if the device 34 is not in the commissioned state, then the decommissioning menu item 208 may be shown as inactive. Likewise, if the device 34 is in the commissioned state, then the commissioned menu item 206 may be shown as inactive. By providing visual displays of devices and their associated states, and contextual menus 204 useful in providing visual indications of processes suitable for execution, the screen 182 may more efficiently enable the commissioning, decommissioning, and clearing of field devices.

Figure 7:
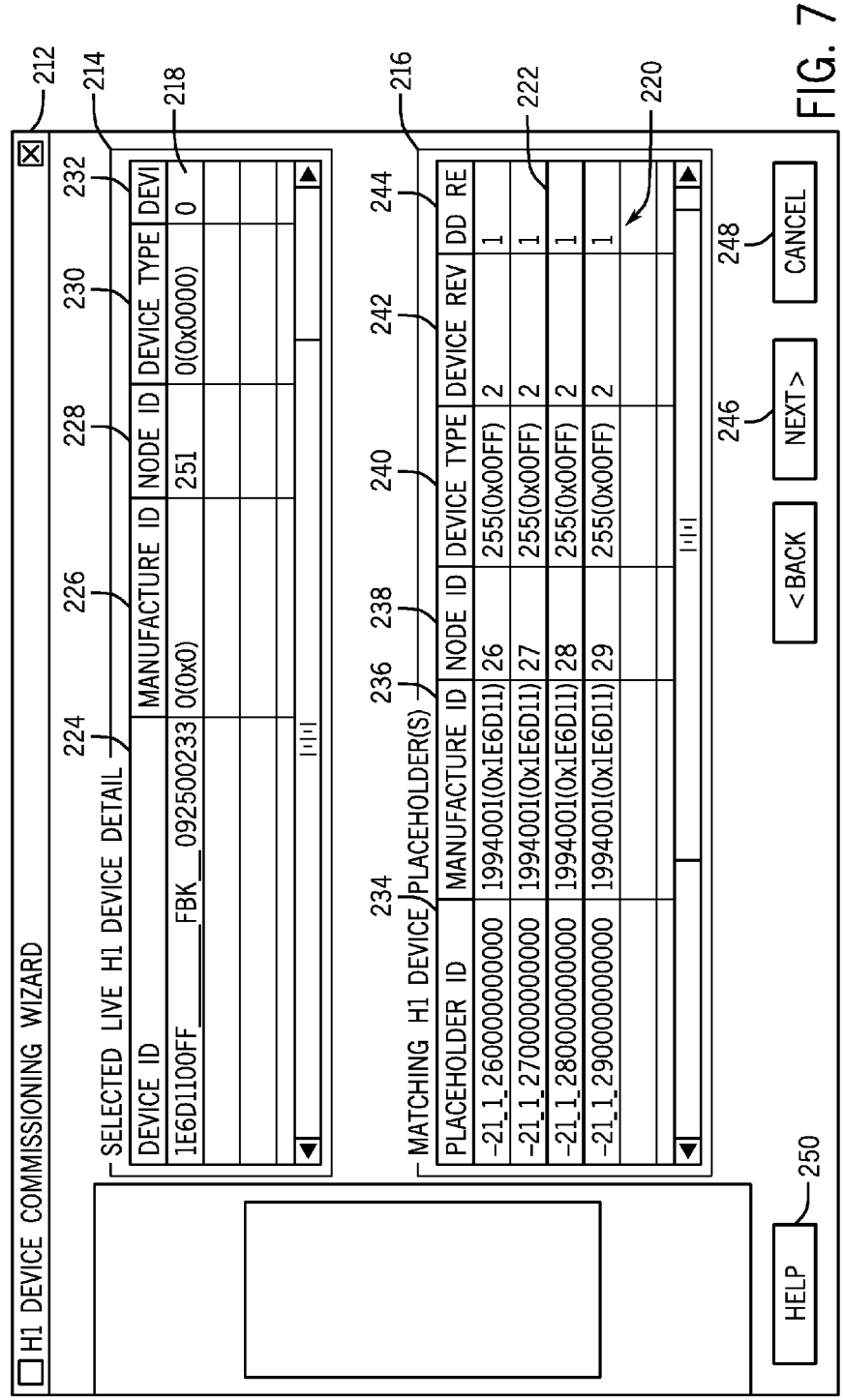
FIG. 7 is a view of an embodiment of a dialog box suitable for implementing a commissioning wizard software tool.

FIG. 7 shows an embodiment of a dialog box 212 that may be used, for example, by the wizard 114 to guide the user during commissioning activities. The dialog box 212 may be included in the GUI 104 of the commissioning/decommissioning system 25, and may be implemented by using computer code or executable instructions stored in a machine-readable medium, such as the memory 16 of the computer 12, and provided by the HMI 18, MES 20, DCS 22, and/or SCADA 24.

As mentioned above, the user may initiate the commissioning process 124 by using the context menu 204, which may in turn activate the dialog box 212. The dialog box 212 includes a section 214 suitable for listing the selected device 34 and/or other selected devices, as well as a section 216 suitable for listing any associated placeholders 120 for the selected devices. As mentioned previously, one or more placeholders 120 may be created for each field device 34, 36, 38, and/or 40 prior to connecting the device into the control system 10. Accordingly, the control system 10 may be configured via placeholders 120 prior to physically connecting the devices 34, 36, 38, and/or 40. Once the devices 34, 36, 38, and/or 40 are physically connected, for example, to linking devices 44 and 46, the wizard 114 may be used to commission the devices 34, 36, 38, and/or 40. It is to be noted that, while the depicted embodiment shows a single row 218 with one device entry, e.g., device 34, the section 214 may include multiple row entries based on multiple selected devices. Likewise, the section 216 includes multiple rows 220, with row 222 selected as the placeholder 120 to be used during commissioning. Indeed, the systems and methods described herein may select multiple devices for commissioning, decommissioning, or clearing, in addition to selecting a single device.

The section 214 includes columns 224, 226, 228, 230, 232 that may be used to list a variety of field device information related to the live devices that are currently communicating through the linking devices 44, 46. For example, column 224 may list device ID information, column 226 may list manufacture ID information, column 228 may list Node ID information, column 230 may list device type information, and column 232 may list device version information. Other information listed by the section 214 may include DD revision, channel, alarm update, and/or update revision information. Likewise, the section 216 includes columns 234, 236, 238, 240, 242, 244 useful in displaying information. For example, the column 234 may list placeholder ID, the column 236 may list placeholder manufacture ID, the column 238 may list placeholder node ID, the column 240 may list placeholder device type, the column 242 may list placeholder device revision, and the column 244 may list placeholder DD revision.

If no matching placeholders 120 are found, for example, if no matching placeholder 120 has been previously created, the section 216 may not include any placeholder row entries 222. Regardless of the number of matching placeholders 120 found, the user may then select one of the listed placeholders to be used during the commissioning process 124, and then activate the "Next>" button 246. The user may also activate the "Cancel" button 248 to exit out of the dialog 212, or activate the "help" button 250 to display help information related to the dialog 212 and the wizard 114. In some cases, the user may have selected a placeholder having certain information different from the selected live device. Accordingly, a warning of mismatched information dialog box may be provided, as described in more detail with respect to FIG. 8.

Figure 8:
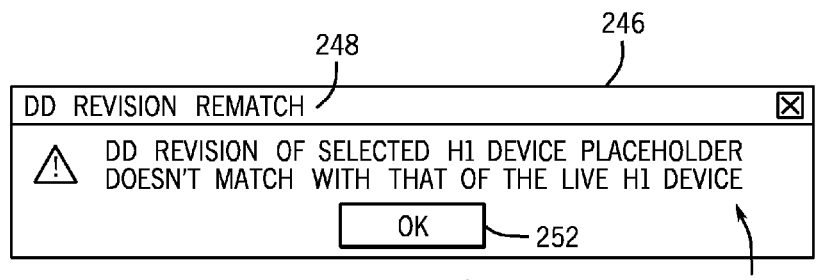
FIG. 8 is a view of an embodiment of a dialog box suitable for displaying warning information.

FIG. 8 depicts an embodiment of a dialog box 246 suitable for displaying warning information, such as when certain selected placeholder information does not match the selected live device information. The dialog box 246 may be included in the GUI 104 of the commissioning/decommissioning system 25, and may be implemented by using computer code or executable instructions stored in a machine-readable medium, such as the memory 16 of the computer 12, and provided by the HMI 18, MES 20, DCS 22, and/or SCADA 24. In the depicted example, the selected placeholder 120 includes DD revision information that does not match the selected live device's 34 DD information. Accordingly, the dialog box 246 displays a title 248 notifying the user that the DD revision information is mismatched, and a message text 250 detailing the reason for the warning. In other examples, the title 248 and the message text 250 may display other mismatched information, such as device revision, manufacture ID, device type, and/or device revision. In some examples, the systems and methods described herein may enable the user to proceed with commissioning activities regardless of mismatched placeholder information. Advantageously, the user may then confirm the mismatch by pressing the okay button 252 and then proceed with commissioning, or, if desired, stop the commissioning process 124.

Figure 9:
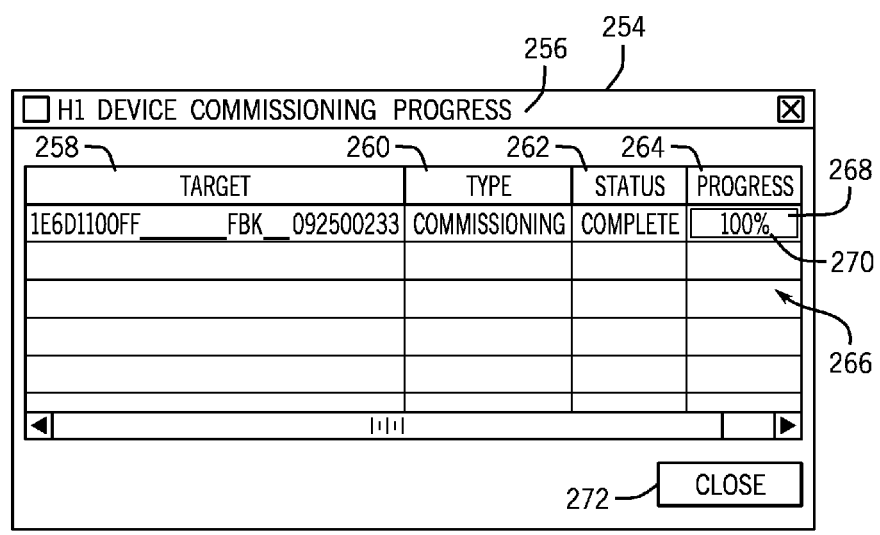
FIG. 9 is a view of an embodiment of a dialog box suitable for displaying a process status information.

FIG. 9 illustrates an embodiment of a dialog box 254 useful in presenting progress information when commissioning, decommission, or clearing a device 34, 36, 38, and/or 40. Indeed, the dialog box 254 may be dynamically reconfigurable based on the progress of the commissioning process 124, the decommissioning process 152, or the clearing process 166. The dialog box 254 may be included in the GUI 104 of the commissioning/decommissioning system 25, and may be implemented by using computer code or executable instructions stored in a machine-readable medium, such as the memory 16 of the computer 12, and provided by the HMI 18, MES 20, DCS 22, and/or SCADA 24.

As depicted, the dialog box 254 includes a title 256, and columns 258, 260, 262, 264. Section 266 may depict one or more rows representative of ongoing commissioning, decommissioning, and or clearing activities for the devices 34, 36, 38, and/or 40. Column 258 is used to display the target device, e.g., device 34, participating in the process, for example, by displaying the device tag for the device 34. The column 260 may be used to further display a process type (e.g., commissioning process 124, decommissioning process 152, clearing process 166), while the column 262 may be used to display a status (e.g., complete, in-progress) of the process. Column 264 may then be used to provide a graphical representation of the progress, such as by displaying a bar 268 and text 270 representative of a progress percent (e.g., approximately between 0 and 100%). The "Close" button may be activated to close the dialog box 254.

Figure 10:
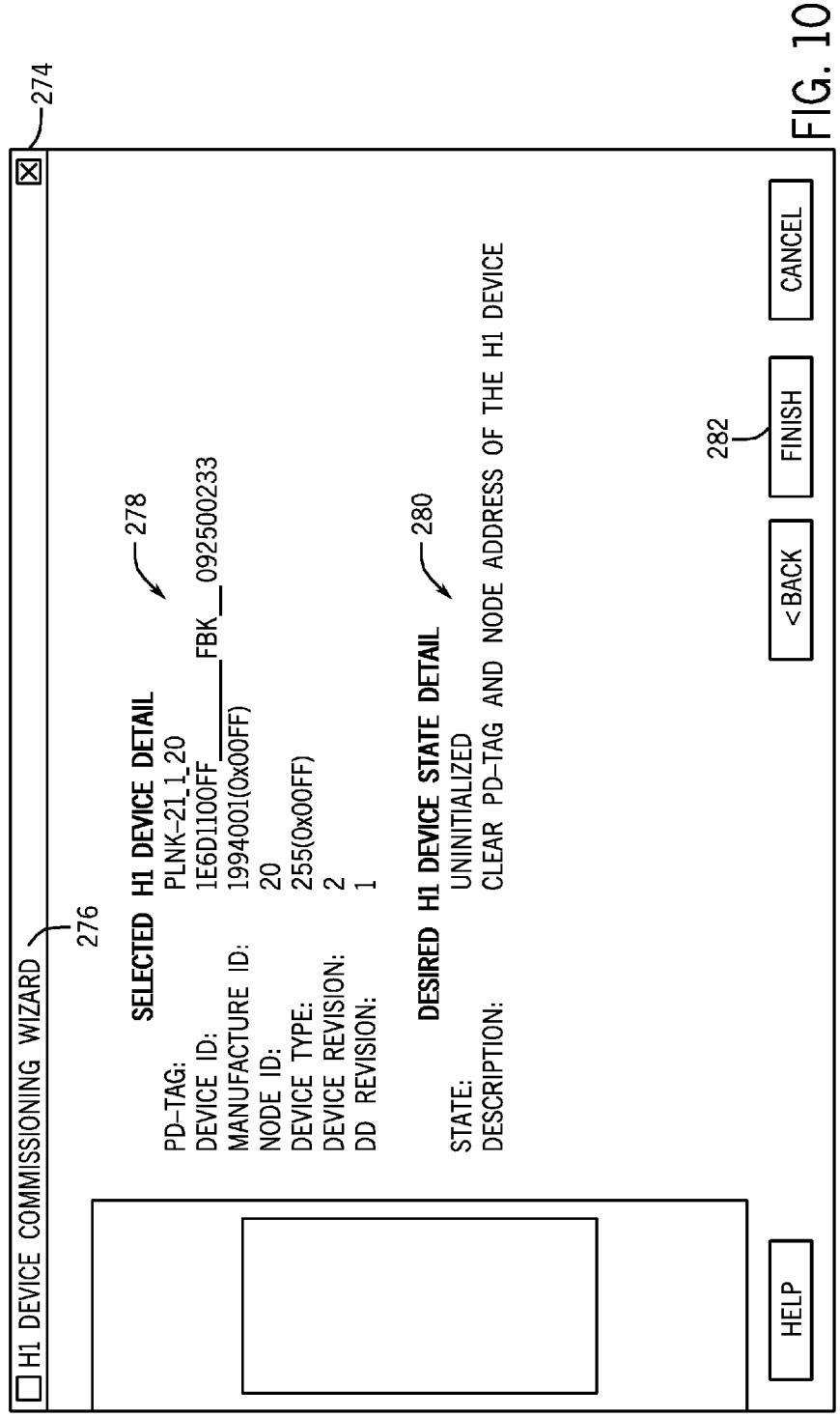
FIG. 10 is a view of an embodiment of a dialog box suitable for implementing a decommissioning wizard and/or a clearing wizard software tool.

FIG. 10 depicts an embodiment of a dialog box 274 that may be used by the decommissioning wizards 116 and/or the clearing wizard 118 to commission or to clear a desired device, e.g., the device 34. The dialog box 274 may be included in the GUI 104 of the commissioning/decommissioning system 25, and may be implemented by using computer code or executable instructions stored in a machine-readable medium, such as the memory 16 of the computer 12, and provided by the HMI 18, MES 20, DCS 22, and/or SCADA 24.

As mentioned previously, the user may use the context menu 204, among other systems, to active the dialog box 274. In the depicted embodiment, the dialog box 274 includes a title 276 suitable for displaying more general commissioning or decommissioning information. Likewise, the dialog box 274 includes a section 278 suitable for displaying detail information related to the device 34 and a section 280 suitable for displaying detail information related to the decommissioning or clearing activities. Accordingly, the user may visually inspect the sections 278 and 280, and once satisfied with the information, may then actuate the "finish" button 282. Activating the button 282 may then result in the execution of the decommissioning process 152 or the clearing process 168, and may also result in the activation of the dialog box 254 (shown in FIG. 9) to display relevant progress information. By providing the wizards 116 and 118 through the dialog box 274, the systems and methods described herein may provide for more efficient decommissioning and clearing process 152 and 168.

Figure 11:
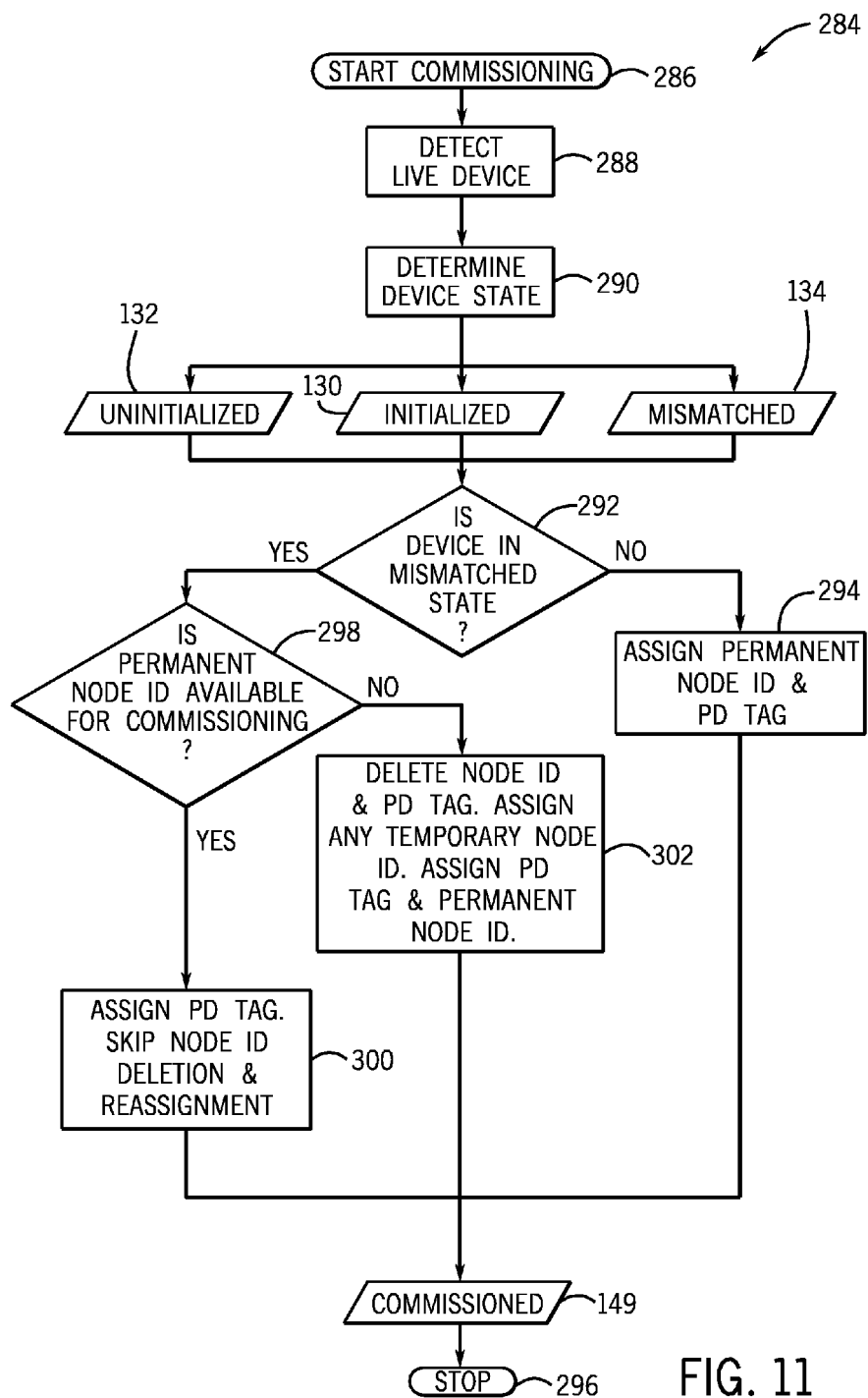
FIG. 11 is a flowchart of a process suitable for commissioning a field device regardless of the number of allocated temporary nodes.

Turning to FIG. 11, the figure depicts a process 284 suitable for more efficiently commissioning field devices 34, 36, 38, and/or 40. For example, the process 284 may skip the performance of certain steps while commissioning the field devices 34, 36, 38, and/or 40, thus minimizing time and effort. Indeed, in certain cases, the process 284 may avoid the physical removal and reconnection of certain of the devices 34, 36, 38, and/or 40, thus possibly saving a considerable amount of time and effort. The process 284 may be stored in the memory 16 of the computer 12 as non-transitory tangible computer readable media including executable computer instructions configured to implement the process 284.

The process 284 may begin commissioning (block 286) one or more of the field devices 34, 36, 38, and/or 40. For example, the process 284 may be detecting changes to the "livelist," (block 288) and if a field device is physically coupled to the system 10, then the "livelist" may include an updated list having the new field device. Accordingly, the coupling of the device may be automatically detected (block 288). The process 284 may then determine the state (block 290) of the newly coupled field device. As mentioned above, a device with no PD tag, no permanent node ID, and a temporary node ID (e.g., ID between 248 to 251) may be determined (block 290) to be in the uninitialized state 132. Likewise, a device with a PD tag, with no permanent node ID, and with a temporary node ID (e.g., ID between 248 to 251), may be in the initialized state 130. Similarly, a device with a PD tag, with a permanent node ID (e.g., 20-247), with a node address that is not assigned, and with no DD file reference may be in the mismatched state 134.

If the device is not in the mismatched state (decision 292), then the device may have a permanent node ID assigned and a PD tag assigned or reassigned (block 294). For example, if the device is in the uninitialized state 132 then the PD tag may be assigned, and if the device is in the initialized state 130 then the PD tag may be reassigned (block 294). Accordingly, the device is placed into the commissioned state 149, and the process 284 may then stop (block 296).

If the device is in the mismatched state (decision 292), then process 284 may determine (decision 298) if the permanent node ID currently allocated to the field device (e.g., device 34, 36, 38, and/or 40) is available for commissioning. That is, in certain circumstances, the permanent node ID of the mismatched field device is not allocated (decision 298). Accordingly, the process 284 may save time and effort and commission the field device by assigning a PD tag to the field device and skipping any permanent node ID deletion and reassignment (block 300). Indeed, in some cases, it may be possible to skip block 302 and permanent node ID deletion and reassignment and simply assign the PD tag for the field device (block 300).

If the process 284 determines (decision 298) that the permanent node ID of the mismatched device is not available (e.g., the permanent node ID may be allocated), then the process 284 may delete the permanent node ID and the PD tag for the mismatched device (e.g., 34, 36, 38, and/or 40), assign an available temporary ID, and assign a new PD tag and a permanent node ID (block 302). Accordingly, the field device may be transitioned into the commissioned state 149 and the process 284 may stop.

Technical effects of the invention include a more efficient commissioning and decommissioning of field devices by using device state information, including a mismatched state, an uninitialized state, an initialized state, and a commissioned state. Systems and methods are also provided to visualize the aforementioned state information in hierarchical displays suitable for enabling the execution of commissioning, decommissioning, and/or clearing processes. Icons are also provided, that depict field device state information in visual manner that may present state information in more efficient manner. Dialog boxes are further provided, suitable in providing commissioning, decommissioning, and clearing wizard software tools. The wizard software tools may guide a user, such as a commissioning engineer, through the commissioning, decommissioning, and clearing processes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a processor configured to execute:
a commissioning system configured to operatively couple a field device to a control system;
a decommissioning system configured to operatively uncouple the field device from the control system; and
a graphical user interface (GUI) configured to use the commissioning system, the decommissioning system, or a combination thereof, to operatively couple the field device to the control system, operatively uncouple the field device to the control system, or a combination thereof, by using a plurality of field device states comprising a mismatched state and a commissioned state, wherein the commissioning system is configured to transition the field device from the mismatched state into the commissioned state if the field device is determined to be in the mismatched state, and wherein the commissioning system is configured to determine if a first permanent node identification (ID) assigned to the field device is available for commissioning, and if the first permanent node ID is available, then to assign a first physical device (PD) tag to the field device and to skip a second permanent node ID deletion and a second permanent node ID reassignment.

2. The system of claim 1, wherein the commissioning system is configured to determine if the first permanent node ID assigned to the field device is available for commissioning, and if the first permanent node ID is not available, then to delete first permanent node ID and a first PD tag assigned to the field device and to assign a temporary node ID, a second PD tag, and a second permanent node ID to the field device.

3. The system of claim 1, comprising a linking device configured to communicatively couple the field device to the control system.

4. The system of claim 1, wherein the plurality of field device states comprises only the mismatched state, an uninitialized state, an initialized state, and the commissioned state.

5. The system of claim 1, wherein the mismatched state comprises a PD tag assigned to the field device, a permanent node ID assigned to the field device, and a node address not assigned to the field device.

6. The system of claim 1, wherein the GUI comprises a hierarchical control configured to display visualizations representative of a linking device, the field device, the plurality of field device states, or a combination thereof.

7. The system of claim 6, wherein the visualizations representative of the plurality of field device states comprise a plurality of graphical icons.

8. The system of claim 1, comprising a high speed Ethernet network and a Foundation H1 network, wherein a linking device is configured to link the high speed Ethernet network to the Foundation H1 network, and the field device is attached to the Foundation H1 network.

9. The system of claim 1, comprising a placeholder representative of the field device, wherein the commissioning system is configured to use the placeholder to commission the field device.

10. The system of claim 1, comprising a turbine system, a power generation system, or a combination thereof, having the field device.

11. A method, comprising:
detecting the coupling of a field device to a control system;
determining a state for the field device;
assigning a first permanent node identification (ID) and a first physical device (PD) tag to the field device if the field device is not in a mismatched state, wherein assigning the first permanent node ID and the first PD tag transitions the field device to a commissioned state, and
determining if a second permanent node ID assigned to the field device is available for commissioning if the field device is in the mismatched state,
if the second permanent node ID is not available, then deleting the second permanent node ID and a second PD tag assigned to the field device, and assigning a temporary node ID, a third PD tag, and a third permanent node ID to the field device.

12. The method of claim 11, comprising:
if the second permanent node ID is available, then assigning the second PD tag to the field device and skipping the assigning of the temporary node ID, the third PD tag, and the third permanent node ID to the field device.

13. The method of claim 11, wherein the mismatched state comprises a PD tag assigned to the field device, a permanent node ID assigned to the field device, and wherein no node address has been assigned to the field device.

14. The method of claim 11, wherein commissioning the field device comprises using a PD tag, a manufacture identification (ID), a node ID, a device type, a device revision, a device description (DD) revision, or a combination of, included in a placeholder.

15. A non-transitory tangible computer-readable medium comprising executable code, the executable code comprising instructions for:
- detecting the coupling of a field device to a control system;
- determining a state for the field device;
- assigning a first permanent node identification (ID) and a first physical device (PD) tag to the field device if the field device is not in a mismatched state, wherein assigning the first permanent node ID and the first PD tag transitions the field device to a commissioned state; and
- determining if the field device is in the mismatched state;
- if the field device is in the mismatched state, then determining if a second permanent node ID assigned to the field device is available for commissioning; and
- if the second permanent node ID is not available, then deleting the second permanent node ID and a second PD tag assigned to the field device, and assigning a temporary node ID, a third PD tag, and a third permanent node ID to the field device.

16. The non-transitory tangible computer-readable medium of claim 15, comprising instructions configured to determine if the second permanent node ID is available;
- if the second permanent node ID is available, then assigning the second PD tag to the field device and skipping the assigning of the temporary node ID, the third PD tag, and the third permanent node ID to the field device.

17. The non-transitory tangible computer-readable medium of claim 15, wherein the mismatched state comprises a physical device PD tag assigned to the field device, a permanent node ID assigned to the field device, and wherein no node address has been assigned to the field device.

* * * * *